(12) United States Patent
Rastogi et al.

(10) Patent No.: US 7,307,400 B2
(45) Date of Patent: Dec. 11, 2007

(54) INVERTER OPERATION WITH OVER-MODULATION

(75) Inventors: Mukul Rastogi, Murrysville, PA (US); Marc F. Aiello, Oakmont, PA (US); Richard H. Osman, Pittsburgh, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/420,578

(22) Filed: May 26, 2006

(65) Prior Publication Data

US 2006/0279249 A1    Dec. 14, 2006

Related U.S. Application Data

(60) Provisional application No. 60/685,311, filed on May 27, 2005.

(51) Int. Cl.
*H02P 27/04* (2006.01)
*H02P 7/622* (2006.01)
*H02M 1/12* (2006.01)

(52) U.S. Cl. .................. 318/801; 318/807; 363/43

(58) Field of Classification Search ........... 318/781, 318/801, 759, 798; 363/71, 131, 132
See application file for complete search history.

(56) References Cited

U.S. PATENT DOCUMENTS

| | | | | |
|---|---|---|---|---|
| 4,780,650 A * | 10/1988 | Miyazaki et al. | ............. | 318/71 |
| 5,614,803 A * | 3/1997 | Morioka et al. | ............. | 318/801 |
| 5,625,545 A * | 4/1997 | Hammond | .............. | 363/71 |
| 5,638,263 A * | 6/1997 | Opal et al. | ................... | 363/65 |
| 5,680,299 A | 10/1997 | Yasuda et al. | ................ | 363/41 |
| 6,014,323 A * | 1/2000 | Aiello et al. | ................. | 363/71 |
| 6,151,227 A * | 11/2000 | Mizutani et al. | ............. | 363/41 |
| 6,229,722 B1 * | 5/2001 | Ichikawa et al. | ............. | 363/71 |
| 6,262,555 B1 * | 7/2001 | Hammond et al. | ......... | 318/759 |
| 6,301,130 B1 * | 10/2001 | Aiello et al. | ................. | 363/37 |
| 6,313,600 B1 * | 11/2001 | Hammond et al. | ......... | 318/798 |
| 6,417,644 B2 * | 7/2002 | Hammond et al. | ......... | 318/759 |
| 6,590,361 B2 * | 7/2003 | Walters et al. | ............. | 318/727 |
| 6,969,967 B2 * | 11/2005 | Su | ............................. | 318/801 |
| 7,031,176 B2 * | 4/2006 | Kotsopoulos et al. | ....... | 363/131 |
| 2001/0019253 A1 * | 9/2001 | Hammond et al. | ......... | 318/759 |
| 2005/0226017 A1 * | 10/2005 | Kotsopoulos et al. | ....... | 363/125 |
| 2006/0077701 A1 * | 4/2006 | Baudesson et al. | ......... | 363/132 |

FOREIGN PATENT DOCUMENTS

| | | |
|---|---|---|
| DE | 19614627 | 10/1997 |
| DE | 10106245 | 7/2002 |
| JP | 2005137200 | 5/2005 |
| WO | DE19614627 | 10/1997 |

(Continued)

OTHER PUBLICATIONS

Ned Mohan et al., "Power Electronics: Converters, Applications, and Design", Second Edition, John Wiley & Sons, New York, New York, pp. 202-211, no date.

(Continued)

*Primary Examiner*—Paul Ip

(57) ABSTRACT

A variable frequency drive including a plurality of power cells that are configured as three phases of series-connected cells to deliver power to a load. The drive is operated to increase the output voltage of each power cell using over-modulation.

18 Claims, 5 Drawing Sheets

FOREIGN PATENT DOCUMENTS

| | | |
|---|---|---|
| WO | JP2005137200 | 12/2000 |
| WO | DE10106245 | 7/2002 |

OTHER PUBLICATIONS

H.W. Van Der Broeck et al., "Analysis and Realization of a Pulse Width Modulator Based on Voltage Space Vectors", Institute for Power Electronics and Electrical Drives, Aachen, University of Technology, West Germany, 1986, pp. 244-251.

Ahmet M. Hava, "Carrier Based PWM-VSI Drives in the Overmodulation Region", (Thesis) University of Wisconsin-Madison, Madison, Wisconsin, Dec. 1998, pp. 144-274.

* cited by examiner

US 7,307,400 B2

INVERTER OPERATION WITH OVER-MODULATION

RELATED APPLICATIONS AND CLAIM OF PRIORITY

This application claims priority to pending U.S. provisional patent application No. 60/685,311, filed May 27, 2005, entitled "Harmony Topology with Over-Modulation," which is incorporated herein by reference in its entirety.

TECHNICAL FIELD

This document relates to electronic devices, such as variable frequency drives, that use one or more inverters. In particular, this document relates to methods and systems for operating a set of inverters using over-modulation.

BACKGROUND

Variable frequency alternating current (AC) drives are used for various applications to deliver power to a load. For example, FIG. 1 illustrates a drive circuit comprising series-connected power cells that include inverters as described in U.S. Pat. No. 5,625,545 to Hammond, the disclosure of which is incorporated herein by reference in its entirety. Referring to FIG. 1, a transformer 110 delivers three-phase, medium-voltage power to a load 130 such as a three-phase induction motor via an array of power cells. The transformer 110 includes a primary winding 112 that excites any number of secondary windings 114-125. Although primary winding 112 is illustrated as having a star configuration, a mesh configuration is also possible. Further, although secondary windings 114-125 are illustrated as having a mesh configuration, star-configured secondary windings are possible, or a combination of star and mesh windings may be used. Further, the number of secondary windings illustrated in FIG. 1 is merely exemplary, and other numbers of secondary windings are possible. The circuit may be used for medium voltage applications or, in some embodiments other applications. A local control system 192 may be used to control each power cell, such as for turning transistors in each cell on or off. In some embodiments, the local control system 192 may be directed by a central control system 195 via a wireless or wired communications network 190.

Each secondary winding is electrically connected to a dedicated power cell 151-153, 161-163, 171-173 and 181-183 so that three phases of series-connected power cells are connected to deliver three-phase power to a load 130.

It should be noted that the number of cells per phase depicted in FIG. 1 is exemplary, and more or less than four cells per phase may be possible in various embodiments. For example, in one embodiment which can be applied to 2300 volts AC (VAC) inductive motor loads, three power cells may be used for each of the three phase output lines. In another embodiment, which may be applied to a 4160 VAC inductive motor load, five power cells may be used for each of the three phase output lines. Such an embodiment may have eleven voltage states which may include approximately +/−3000 volts DC (VDC), +/−2400 VDC, +/−1800 VDC, +/−1200 VDC, +/−600 VDC and zero VDC, It is desirable to find methods and systems that help to reduce the size and/or cost of circuit configurations that use series-connected inverters, including but not limited to the circuits described in FIG. 1. The disclosure contained herein describes methods and systems that solve one or more of the problems described above.

SUMMARY

In an embodiment, a variable frequency drive includes a plurality of power cells. Each power cell has an input to receive three-phase power from a secondary winding of a transformer, and each power cell has an output to deliver single-phase power to a phase of a three-phase motor. A control system controls the operation of each of the power cells. The control system is programmed to increase the output voltage of each of the power cells using overmodulation upon the occurrence of a predetermined event. The predetermined event may include, for example, at least one of steady-state operation of the motor, the motor having reached a predetermined percentage of rated speed, the detection of a voltage change that crosses a threshold level, or the detection of bypass of at least one of the power cells.

In one embodiment, each power cell is rated to operate with an input AC voltage of approximately 740 volts to approximately 780 volts, the motor is rated to operate at approximately 4160V, and the drive includes less than twelve power cells. In another embodiment, each power cell is rated to operate with an input AC voltage of approximately 740 volts to approximately 780 volts, the motor is rated to operate at approximately 4160V, the drive includes at least twelve cells, and at least one cell per phase provides redundancy. In another embodiment, each power cell is rated to operate with an input AC of approximately 740 volts to approximately 780 volts, the motor is rated to operate at approximately 6.6 kilovolts to approximately 6.9 kilovolts, and the drive includes less than eighteen power cells. In another embodiment, each power cell is rated to operate with an input AC voltage of approximately 740 volts to approximately 780 volts, the motor is rated to operate at approximately 6.6 kilovolts to approximately 6.9 kilovolts, the drive includes at least eighteen cells, and at least one cell per phase provides redundancy. In another embodiment, each power cell is rated to operate with an input AC of approximately 740 volts to approximately 780 volts, the motor is rated to operate at approximately 10 kilovolts, and the drive includes less than twenty-four power cells. In another embodiment, each power cell is rated to operate with an input AC voltage of approximately 740 volts to approximately 780 volts, the motor is rated to operate at approximately 10 kilovolts, the drive includes at least twenty-four cells, and at least one cell per phase provides redundancy.

In an alternate embodiment, a variable-frequency drive includes a plurality of power cells. Each power cell has an input to receive three-phase power from a secondary winding of a transformer. Each power cell also has an output to deliver single-phase power to a phase of a three-phase load, if the load is rated to operate at approximately 4160 volts, the drive includes fewer than twelve power cells. If the load is rated to operate at approximately 6.6 kilovolts to approximately 6.9 kilovolts, the drive includes fewer than eighteen power cells. If the load is rated to operate at approximately 10 kilovolts, the drive includes fewer than twenty-four power cells. Each power cell may be rated, for example, to operate with an input AC voltage of approximately 740 volts to approximately 780 volts.

The drive also may include a control system that increases the output voltage of each of the power cells using overmodulation upon the occurrence of a predetermined event.

In an alternate embodiment, a method of operating a variable frequency drive includes operating a plurality of power cells that are configured as three phases of series-connected cells to deliver power to a load. The method includes increasing the output voltage of each power cell using overmodulation. The use of overmodulation may be performed under a steady-state condition, and it also may be performed under a transient condition. Optionally, the overmodulation technique may include sinusoidal modulation, sinusoidal modulation with third-harmonic injection, or other suitable methods. The output voltage increase may be, for example, up to approximately 10.2% above the cells' normal output voltage at the supplied input voltage.

In some embodiments, the method also may include monitoring the operating speed of the load, and only permitting the use of overmodulation when the operating speed is at or above a predetermined level, such as is approximately 95% of the maximum speed of the load. Optionally, the method also may include monitoring the power cells to detect when a power cell has been bypassed, and triggering the use of overmodulation upon detection of a bypass.

In an alternate embodiment, a variable frequency drive includes a plurality of power cells. Each power cell has an input to receive three phase power from a secondary winding of a transformer, and each power cell has an output to deliver single-phase power to a phase of a three-phase motor. A control system controls the operation of each of the power cells. The control system is programmed to increase the output voltage of each of the power cells using overmodulation. The increase may occur during steady-state operation of the motor, or it may be triggered by the motor having reached a predetermined percentage of rated speed, the detection of a voltage drop, or the detection of bypass of at least one of the power cells, or by some other predetermined event. In some embodiments, each power cell is rated to supply approximately 690 volts, the motor is rated to operate at approximately 4160V, and the drive includes less than twelve power cells. Alternatively, each power cell may be rated to supply approximately 690 volts, the motor may be rated to operate at approximately 4160V, and the drive may include at least twelve cells with fewer than twelve of the cells are required to drive the load at any point in time. Alternatively, each power cell may be rated to supply approximately 690 volts, the motor may be rated to operate at approximately 6.6 kilovolts to approximately 6.9 kilovolts, and the drive may include less than eighteen power cells. As yet another alternative, each power cell may be rated to supply approximately 690 volts, the motor may be rated to operate at approximately 6.6 kilovolts to approximately 6.9 kilovolts, and the drive may includes at least eighteen cells with fewer than eighteen of the cells are required to drive the load at my point in time.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. In addition, the following terms are intended to have the following definitions herein:

capacitor set—one or more capacitors.

comprising—including but not limited to.

control circuit—a first electrical device that signals a second electrical device to change of the second electrical device.

converter—a device that converts AC power to DC power.

electrically connected or electrically coupled—connected in a manner adapted to transfer electrical energy.

Figure 4:
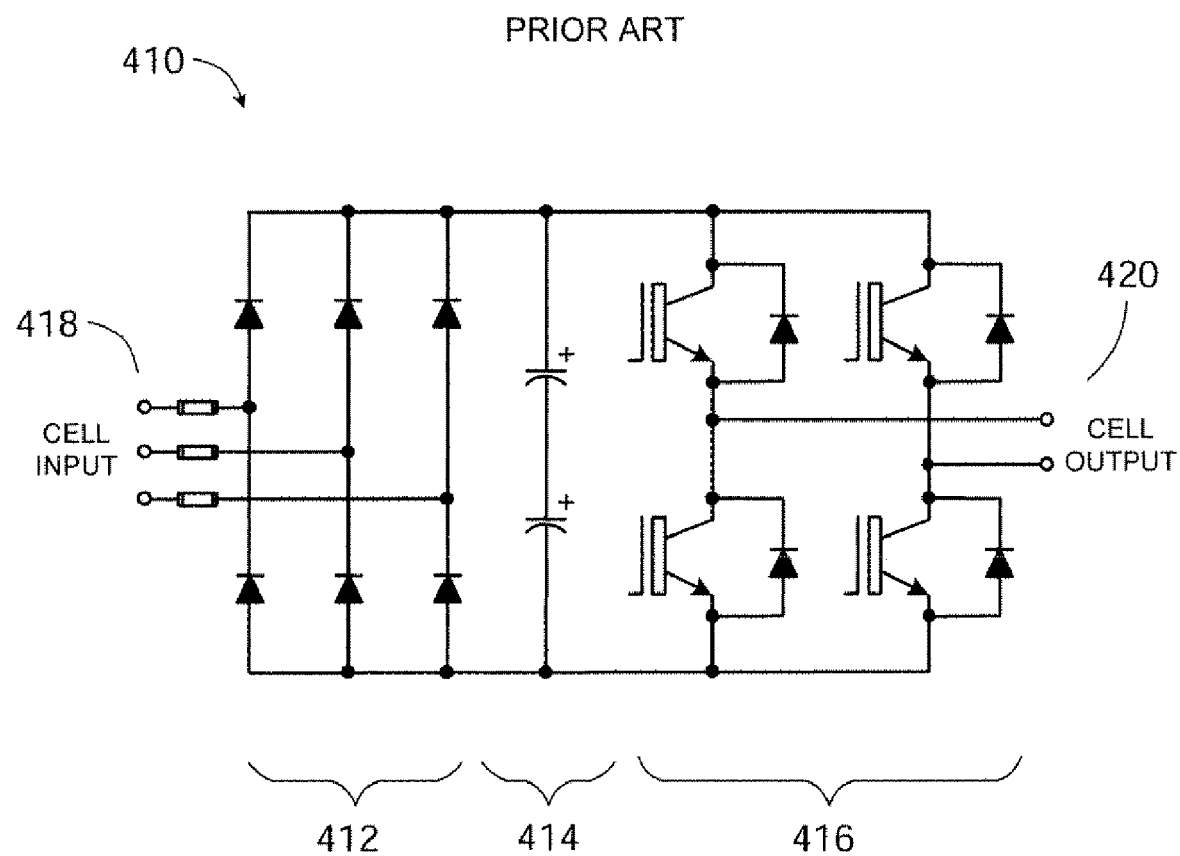
FIG. 4 is a circuit diagram of an exemplary power cell.

H-bridge inverter—a circuit for controlled power flow between AC and DC circuits having four transistors and four diodes. Referring to FIG. 4, an H-bridge inverter 416 generally includes a first phase leg and a second phase leg electrically connected in parallel at the DC terminals. Each leg includes two transistor/diode combinations. In each combination, the diode is electrically coupled across the base and emitter of the transistor.

inverter—a device that converts DC power to AC power or AC power.

medium voltage—a rated voltage greater than 690 volts (V) and less than 69 kilovolts (kV). In some embodiments, medium voltage may be a voltage between about 1000 V and about 69 kV.

power cell—an electrical device that has a three-phase alternating current input and a single-phase alternating current output.

pulse-width modulation—a technique for controlling a circuit by generating variable-width pulses to represent the amplitude of an analog input signal.

steady-state condition—a stable condition that does not substantially change over time.

substantially—to a great extent or degree.

Figure 1:
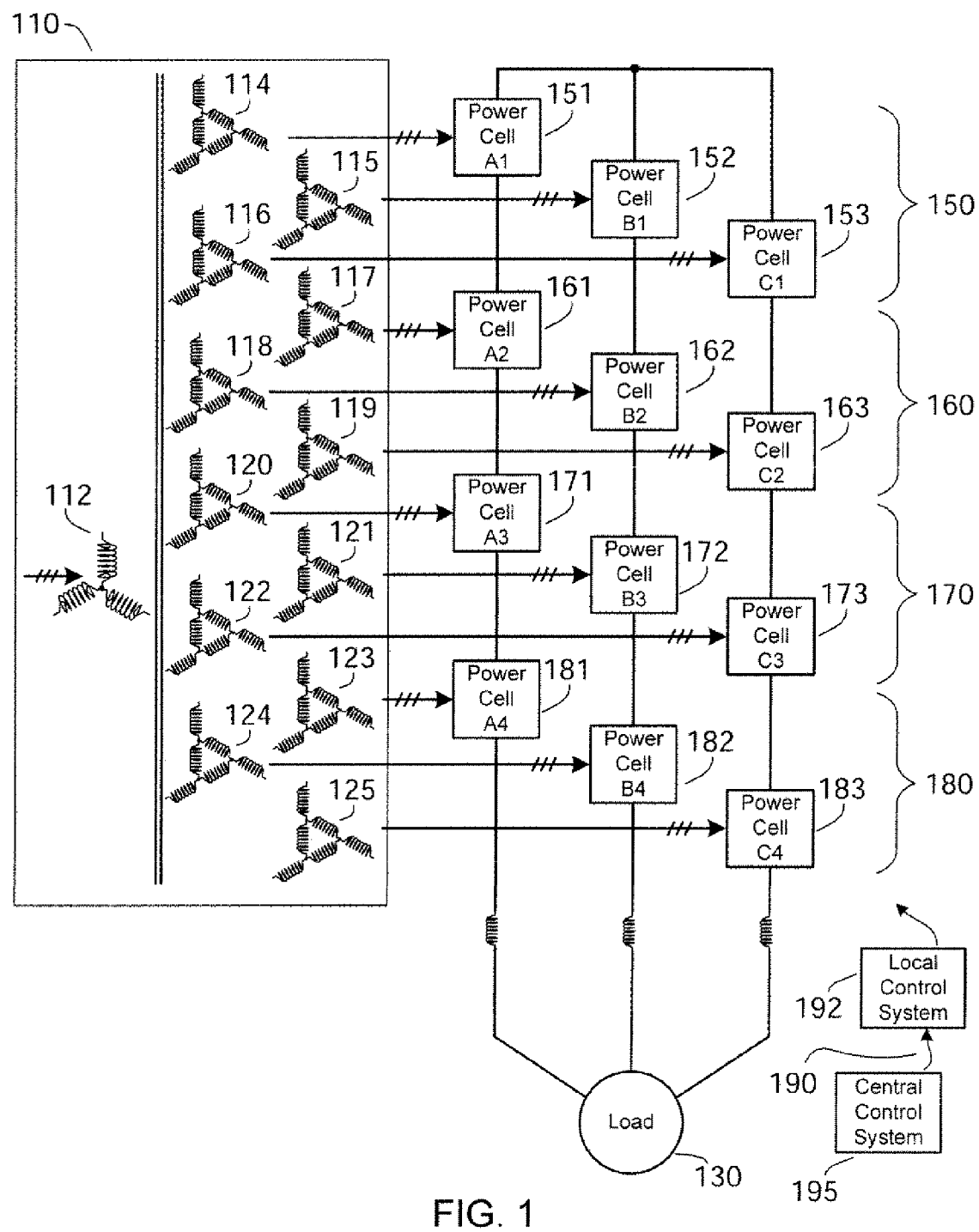
FIG. 1 depicts an exemplary circuit comprising a plurality of power cells connected to a load.

Inverters that convert a DC input to an AC output, such as those that may be used in the drive of FIG. 1, are often controlled using one or more pulse-width modulation (PWM) techniques. One such technique is sinusoidal modulation. In order to produce a sinusoidal output voltage waveform at a desired frequency (also referred to as the fundamental frequency), a sinusoidal voltage reference (i.e., a control signal with amplitude $V_{control}$) may be compared with a triangular waveform (with amplitude $V_{tri}$). The amplitude and frequency of the triangular waveform are typically constant, and the frequency of the triangular waveform establishes the inverter's switching frequency. Sinusoidal modulation allows linear control of the output voltage until the amplitude of a sinusoidal voltage reference is equal to the amplitude of the triangular carrier.

When the amplitude of the sinusoidal reference exceeds the carrier signal amplitude, linear control of the output voltage is lost. When this occurs, the amplitude modulation ratio, $m_a = V_{control}/V_{tri}$, is greater than 1.0. This region of operation is called overmodulation. The region wherein $m_a$ is less than or equal to 1.0 is sometimes referred to as the linear range. Overmodulation (i.e., operation outside of the linear range of the inverter) causes the output voltage to contain a higher level of lower order harmonics (at frequencies close to but higher than the fundamental frequency) than are present in the linear range.

Figure 2A:
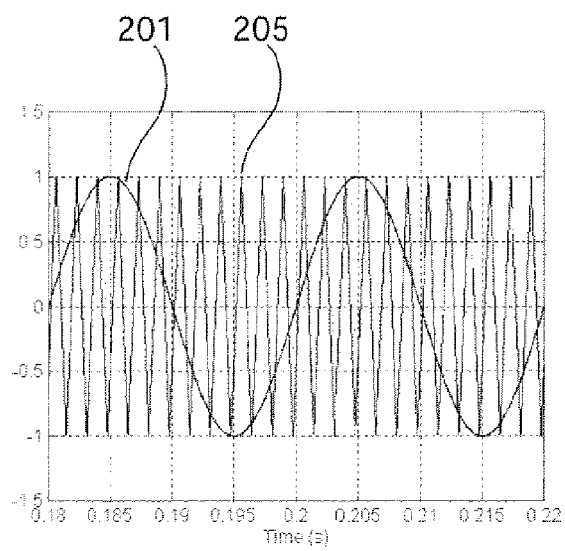
FIGS. 2A and 2B illustrate an example of overmodulation.
Figure 2B:
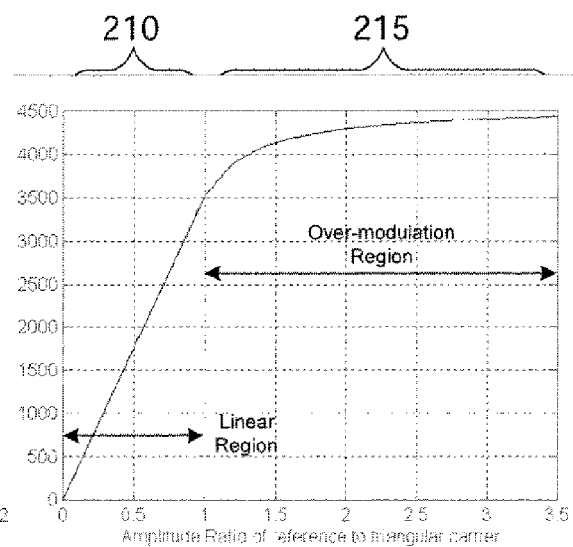

FIG. 2A shows the two signals that are compared in sinusoidal modulation $v_{control}$ 201 and $v_{tri}$ 205. FIG. 2B shows the output voltage as a function of modulation index. As shown in FIG. 2B, the amplitude of the fundamental frequency component of the output voltage linearly varies with the amplitude of the reference signal in the linear region 210. However, the voltage output does not linearly increase with the amplitude of the reference signal after it exceeds the amplitude of the triangular carrier, i.e., when the modulation index exceeds 1.0 and the overmodulation region 215 is entered. In this example, the inverter output voltage is 3500 volts (V) when the modulation index is 1.0, although the present invention is not limited to such an embodiment.

Figures 3A, 3B:
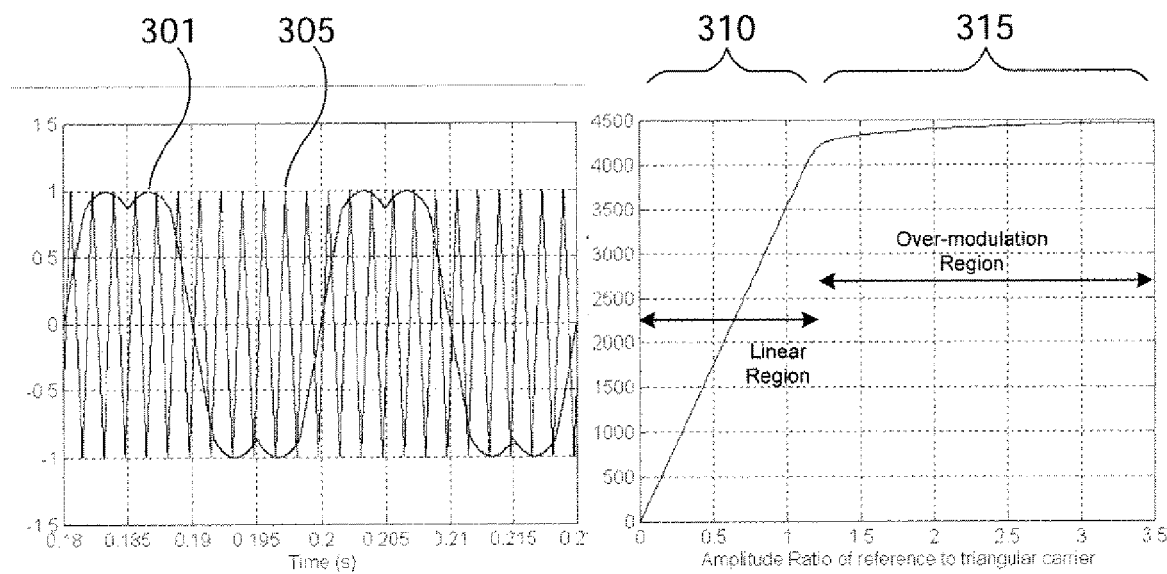
FIGS. 3A and 3B illustrate an example of overmodulation with third-harmonic injection.

Other methods, such as sinusoidal modulation with third-harmonic injection or space vector PWM may be used to extend the range of linear control of an inverter. These methods may allow an increase in the output voltage as compared to the sinusoidal modulation method before linear control is lost. For example, such methods may allow an increase of approximately 15.5% in the output voltage. FIG. 3A illustrates the two signals, $v_{control}$ 301 and $v_{tri}$ 305, that may be compared in a sinusoidal modulation with third-harmonic injection method. FIG. 3B illustrates an exemplary output voltage as a function of modulation index. As shown in FIG. 3B, the voltage output is linear until the modulation index reaches 1.155. At that point, the output voltage is 4040V, which is correspondingly higher than the linear control limit with sinusoidal modulation. Above this modulation index linearity is lost, i.e., when the amplitude of the reference signal exceeds 1.155 times the amplitude of the triangular carrier. Increasing the amplitude of the sinusoidal voltage references above this linear control limit of 115.5% can increase voltage output above 115.5%. In this example, the maximum output of the inverter in the over-modulation region is 127.3% of the voltage produced with a modulation index of 1.0. This is achieved when the sinusoidal reference amplitude is increased beyond 320% of the triangular carrier signal (i.e., when the modulation index is greater than 3.2).

Operation in the over-modulation region may occur in situations when the inverter output is required to be maximized under input transient conditions, such as a sudden loss of the source voltage in the inverter. In such a case, the inverter attempts to maintain maximum possible output voltage by increasing the voltage reference amplitude and operating in the over-modulation region. Once the source voltage is restored, the inverter operates in the linear region to limit the production of lower order harmonics on the output and prevent any long term side-effects of such harmonics from affecting the load.

We have discovered that the use of over-modulation in steady state operation of series-connected inverters may provide one or more advantages in certain embodiments. For example, by intentionally forcing a power cell to operate in the overmodulation region in steady-state operation, the inverter may deliver the same output voltage as it would in the linear region, but with lower source voltage (for example, approximately 10% lower) being delivered to the inverter. Thus, in some embodiments, the components in the inverter, or the input transformer, may be rated at a lower voltage and thus could be less expensive or smaller than with higher-rated components. In addition, such operation (with overmodulation) may provide a higher output voltage (for example, approximately 10% higher), with the same source voltage being delivered to the inverter.

Thus, we have discovered that operation of circuit topologies that use series-connected inverters, including but not limited to that shown in FIG. 1, using over-modulation in the steady state region may have benefits. For example, fewer inverters may be needed in a circuit because the voltage output capability of each inverter may be increased. Such operation has particular advantage in medium voltage applications, although the embodiments described herein are not limited to such applications.

FIG. 4 is a circuit diagram that illustrates exemplary components of a power cell that may be used in a circuit such as that of FIG. 1. Referring to FIG. 4, a prior art power cell 410 may include a three-phase diode-bridge rectifier 412, one or more direct current (DC) capacitors 414, and an IT-bridge or other inverter 416. The rectifier 412 converts the input 418 AC voltage to a substantially constant DC voltage that is supported by the capacitors 414 that are connected across the rectifier 412 output. The output stage of the inverter 410 includes an H-bridge inverter 416 includes two poles, a left pole and a right pole, each with two devices. The inverter 410 transforms the DC voltage across the DC capacitors 414 to an AC output 420 using pulse-width modulation (PWM) of the semiconductor devices in the H-bridge inverter 416. Outputs of the H-Bridge inverters may be connected in series (as shown in FIG. 1) to build up the output voltage. Other circuit configurations may be used for a power cell instead of the circuit illustrated in FIG. 4.

Series-connected inverters such as those shown in FIGS. 1 and 4 are typically used in medium-voltage AC motor drive applications. Accordingly, the embodiments described herein include operating a circuit of series-connected inverters so that each inverter is operated in the overmodulation region. For a power cell that normally receives (or operates with a transformer secondary winding voltage of) 690V, an increase of up to 750V (i.e., an increase of approximately 8.7%), or even an increase of up to 780V (i.e., an approximately 13% increase) may be desirable.

Motors are available only at a few discrete voltage levels that are industry standard, and only some of these levels are extremely popular. Although the invention is not limited to current industry standard voltage levels, the examples listed below describe the use of over-modulation with series-connected inverters at two exemplary voltage levels.

The output voltage in such a circuit can be expressed as a function of the number of power cell ranks (R), the input AC voltage to the power cells (VAC) by the following equation:

$$V_{output} = 1.78 * K_{ovm} * R * VAC$$

Where, $K_{ovm}$ represents the increase in output voltage due to operation with overmodulation and is the range of $1.0 < K_{ovm} < 1.10$. This expression shows that increasing both the AC input voltage to the power cells and the $K_{ovm}$ factor to their practical limits can reduce the number of ranks required to produce a given output voltage. This is illustrated using examples in the following paragraphs.

EXAMPLE 1

To operate a 4160V motor, a drive such as that shown in FIG. 1 with series-connected inverters such as those shown in FIG. 4 may be used. In order to produce this output voltage, the typical drive in the prior art has four series-connected (single-phase) inverters per phase. In other words, there are four ranks of power cells. Each inverter, which may use insulated gate bipolar transistors (IGBTs) or other suitable devices rated at approximately 1700V, receives a 690V AC source and is capable of delivering approximately 709V at the output for a total output of approximately 4912V phase-to-phase (or approximately 2836V per phase). Such an inverter is capable of producing well over the required voltage of 4160V.

However, with three series-connected inverters per-phase (i.e., three ranks of power cells), the total output voltage would be approximately 3684V phase-to-phase (or approximately 2127V per phase). This voltage level is well below the desired output of 4160V. If the inverters are controlled to operate in the overmodulation region (with $K_{ovm}$=1.10), then the three series-connected inverters in per-phase arrangement can provide approximately 4053V phase-phase (or 2340V per-phase) which is slightly less than the desired voltage output.

A small increase in the input source voltage to 740V in each single-phase inverter can provide approximately 4347V phase-to-phase. This is sufficient for the 4160V desired output. The small increase in source voltage can be accommodated with existing IGBT ratings and will not need transistors that are rated for the next higher voltage rating. In some embodiments, a slight increase in capacitor rating of the inverter (i.e., element 414 of FIG. 4) may be required to handle the increased DC bus voltage. Hence this arrangement, which uses only three inverters per-phase, may result in overall size and cost savings.

EXAMPLE 2

Another popular voltage level is 6900V for which the drive of FIG. 1 may be used. In order to produce this output voltage, this drive may be modified to have six series-connected (single-phase) inverters per phase (i.e., six ranks). Each inverter, such as that shown in FIG. 4 which may use IGBTs rated at 1700V, receives a 690V AC source and is capable of approximately 709V at the output for a total output of approximately 4254V per phase, or approximately 7368V phase-to-phase. Such an inverter may be capable of producing well over the required voltage of 4160V.

However, with five series-connected inverters per-phase (i.e., five ranks), the total output voltage would be approximately 6140V phase-to-phase (or approximately 3545V per phase). This voltage level is well below the desired output of 6900V. If over-modulation is used, then the three series-connected inverters in per-phase arrangement may provide approximately 6754V phase-to-phase (or approximately 3900V per phase) which is slightly less than the desired voltage output.

A small increase in the input source voltage to 740V in each single-phase inverter can provide approximately 7243V phase-phase. This is sufficient for the 6900V desired output. The small increase in source voltage can be accommodated with existing IGBT ratings and will not need transistors that are rated for the next higher voltage rating. In some embodiments, a slight increase in capacitor rating of the inverter (i.e., element 414 of FIG. 4) may be required to handle the increased DC bus voltage. However, this arrangement, which uses only five inverters per-phase, also may result in overall size or cost savings.

In the two examples cited above, a further increase in the input source voltage to each cell from 740V to 750V, for example, may be desirable to compensate for voltage drops such as those due to transformer leakage impedance.

EXAMPLE 3

As another example, if it is desired to operate a load that is rated at approximately 10 kilovolts (kV), a drive having 24 series-connected power cells (i.e., 8 ranks of cells), each rated to operate with an input AC voltage of between about 740V and 780 V, may be used in the prior art. With overmodulation, fewer than 24 cells, such as seven ranks of cells could be used to drive the load. Alternatively, 8 or more ranks could be used, with one rank providing redundancy as only seven are required to drive the load when overmodulation is triggered.

Figure 5:
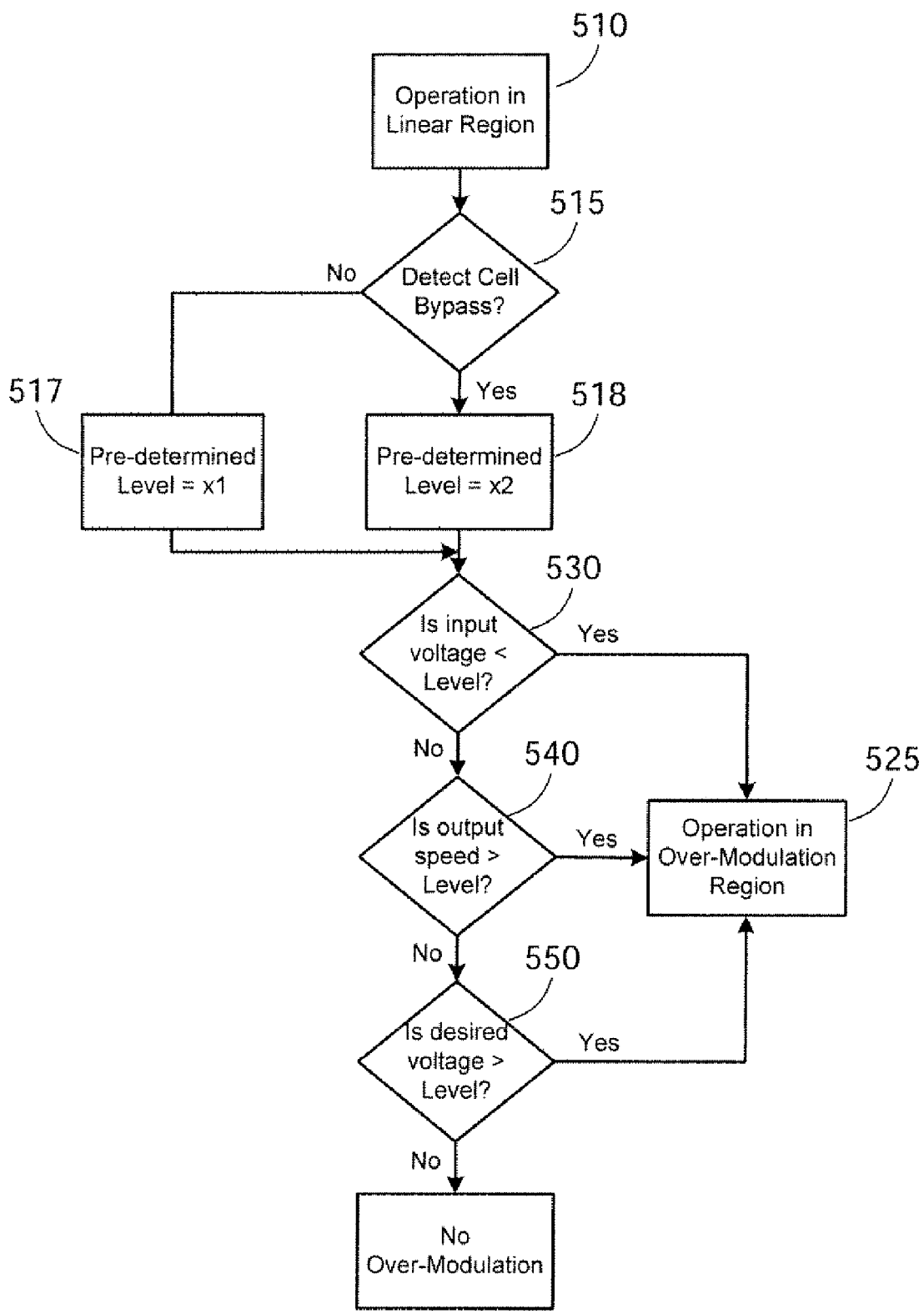
FIG. 5 is a flow diagram illustrating an exemplary overmodulation process.

Referring to FIG. 5, the methods described herein may include using a control system (i.e., element 192 in FIG. 1) to operate a drive such as that shown in FIG. 1 by introducing reference and carrier signals so that the power cell is operated in an overmodulation region 510. In some embodiments, operation in the overmodulation region may occur on all cells in the power circuit during normal—i.e., steady-state—operation of the circuit to drive a motor. In some embodiments, over modulation may also occur during transient operation. In either situation, the control system may monitor the drive to determine whether one or more of the cells has failed or otherwise been bypassed 515, and the control circuit may trigger overmodulation 525 in order to maintain a substantially full output voltage despite the loss of one or more cells. In some embodiments, overmodulation also may be triggered by the occurrence of one or more events.

For example, in some embodiments, overmodulation may be triggered by detecting that the input voltage has crossed a predetermined threshold, such as detecting that voltage to the load has dropped below a predetermined level 530 or increased above a predetermined level 550. Thus, the input voltage to the series-connected inverters may be monitored, or the desired voltage delivered to the load may be monitored, and overmodulation may be triggered. In some embodiments, the trigger may be based on a first predetermined level, such as a voltage drop that results in the input voltage dropping to or below approximately 95% of a predetermined or rated level. Alternatively, in some embodiments, the trigger may be based on an increase of the desired load voltage above a certain level, such as approximately 95% of the rated motor voltage In some embodiments, it also may be desirable to limit the introduction of overmodulation depending on the operating speed of the motor 540. Thus, for example, overmodulation may be limited to operating conditions that are between about 95% and about 100% of rated speed, or conditions that are between about 97% and about 100% of desired maximum speed, or at other desired conditions.

In some embodiments, overmodulation may be controlled to be triggered by a combination of factors, such as the detection of a cell bypass and change in the operating speed. In some cases, the predetermined threshold speed and voltage levels may differ 517, 518, depending on whether a cell bypass has been detected 515.

The control system may apply any now or hereafter known overmodulation techniques to accomplish the goals described herein. For example, the techniques described in Hava, "Carrier-Based PWM-VSI Drives in the Overmodulation Region", published as a Ph.D thesis December 1998 at the University of Wisconsin-Madison (Madison, Wis., U.S.A.) may be used.

In some embodiments, overmodulation may result in each power cell having an output voltage that is between approximately 0% and approximately 10.2% higher than its normal operation based on the input voltage. In other embodiments, overmodulation may result in each power cell having an output voltage that is between approximately 2% and approximately 10% higher than its normal operation. In other embodiments, overmodulation may result in each power cell having an output voltage that is approximately 2.7% higher than its normal operation.

With overmodulation, fewer power cells may be needed to drive a load. Thus, the overall circuit could be smaller. Alternatively, the circuits that would normally be used to drive a load could instead serve to provide redundancy in the event of a power cell failure. For example, referring to FIG. 1, in a circuit where power cells are rated to operate with an input AC voltage of 690V, four ranks of cells 150, 160, 170 and 180 are normally required to drive a load of 4160V or approximately 4 kilovolts (kV). Each rank includes three power cells one cell per phase and under normal operation the circuits therefore normally require twelve power cells 151-153, 161-163, 171-173 and 181-183. If the power cells are controlled using overmodulation and each power cell is operated with an input AC voltage of approximately 740V to approximately 780V, only three ranks 150, 160 and 170 (i.e., nine power cells 151-153, 161-163, 171-173) are required to provide 4160V. Unlike prior systems, fewer than twelve power cells are required, as the fourth rank 180 could be omitted as mentioned in Example 1 above. Alternatively, the fourth rank 180 could be included in the circuit but only used to provide a redundancy of one power cell per phase for a 4160V rated motor voltage.

Similarly, in a circuit that drives a load at approximately 6.6 kV or approximately 6.9 kV, six ranks of power cells (i.e., eighteen total power cells) if the power cells are rated to operate with an input AC voltage of approximately 690V. Using overmodulation and with each power operating with an input AC voltage of approximately 740V to approximately 780V, this circuit could supply 6900V to the load using and only five ranks (i.e, fifteen power cells) as described in Example 2 above. The sixth rank could be omitted from the circuit or it could be included in the circuit to provide redundant power cells.

The selection of power cells is not limited to the embodiments described herein, and any number of power cells can be selected based on the desired voltage that must be supplied to power a load.

Still other embodiments will become readily apparent to those skilled in this an from reading the above-recited detailed description and drawings of certain exemplary embodiments. Even though only two modulation methods have been shown, other modulation methods can also be combined with the proposed use of overmodulation in series-connected inverters. It should be understood that numerous variations, modifications, and additional embodiments are possible, and accordingly, all such variations, modifications, and embodiments are to be regarded as being within the spirit and scope of this application. Accordingly, the descriptions and drawings are to be regarded as illustrative in nature, and not as restrictive. Moreover, when any number or range is described herein, unless clearly stated otherwise, that number or range is approximate.

What is claimed is:

1. A variable frequency drive, comprising:
   a plurality of power cells, wherein each power cell comprises an input to receive three-phase power from a secondary winding of a transformer and an output to deliver single-phase power to a phase of a three-phase motor, and wherein each power cell is configured without a neutral connection between the input and the output;
   a control system that controls the operation of each of the power cells;
   wherein the control system is programmed to increase the output voltage of each of the power cells using overmodulation upon the occurrence of a predetermined event while maintaining equal power flow through each power cell.

2. The drive of claim 1, wherein each power cell is rated to operate with an input AC voltage of approximately 740 volts to approximately 780 volts, the motor is rated to operate at approximately 4160V, and the drive includes less than twelve power cells.

3. The drive of claim 1, wherein each power cell is rated to operate with an input AC voltage of approximately 740 volts to approximately 780 volts, the motor is rated to operate at approximately 4160V, the drive includes at least twelve cells, and at least one cell per phase provides redundancy.

4. The drive of claim 1, wherein each power cell is rated to operate with an input AC of approximately 740 volts to approximately 780 volts, the motor is rated to operate at approximately 6.6 kilovolts to approximately 6.9 kilovolts, and the drive includes less than eighteen power cells.

5. The drive of claim 1, wherein each power cell is rated to operate with an input AC voltage of approximately 740 volts to approximately 780 volts, the motor is rated to operate at approximately 6.6 kilovolts to approximately 6.9 kilovolts, the drive includes at least eighteen cells, and at least one cell per phase provides redundancy.

6. The drive of claim 1, wherein each power cell is rated to operate with an input AC of approximately 740 volts to approximately 780 volts, the motor is rated to operate at approximately 10 kilovolts, and the drive includes less than twenty-four power cells.

7. The drive of claim 1, wherein each power cell is rated to operate with an input AC voltage of approximately 740 volts to approximately 780 volts, the motor is rated to operate at approximately 10 kilovolts, the drive includes at least twenty-four and at least one cell per phase provides redundancy.

8. The drive of claim 1, wherein the predetermined event comprises at least one of steady-state operation of the motor, the motor having reached a predetermined percentage of rated speed, the detection of a voltage change that crosses a threshold level, or the detection of bypass of at least one of the power cells.

9. A variable-frequency drive, comprising:
   a plurality of power cells, wherein:
      each power cell has an input to receive three-phase power from a secondary winding of a transformer;
      each power cell has an output to deliver single-phase power to a phase of a three-phase load;
      each power cell is configured without a neutral connection between the input and the output;
      if the load is rated to operate at approximately 4160 volts, the plurality of power cells comprises fewer than twelve power cells;
      if the load is rated to operate at approximately 6.6 kilovolts to approximately 6.9 kilovolts, the plurality of power cells comprises fewer than eighteen power cells; and
      if the load is rated to operate at approximately 10 kilovolts, the plurality of power cells comprises fewer than twenty-four power cells; and
   a control system that increases the output voltage of the power cells using overmodulation upon the occurrence of a predetermined event while maintaining equal power flow through each power cell.

10. The drive of claim 9, wherein each power cell is rated to operate with an input AC voltage of approximately 740 volts to approximately 780 volts.

11. The drive of claim 9, wherein the predetermined event comprises at least one of steady-state operation of the motor, the motor having reached a predetermined percentage of rated speed, the detection of a voltage change that crosses a threshold level, or the detection of bypass of at least one of the power cells.

12. A method of operating a variable frequency drive, comprising:
   operating a plurality of power cells that are configured as three phases of series-connected cells to deliver power to a load, wherein each power cell is configured without a neutral connection between its input and output;
   using a control system to apply overmodulation to increase the output voltage of at least some of the power cells under steady-state conditions upon the occurrence of a predetermined event while maintaining equal power flow through the some of the power cells.

13. The method of claim 12, further comprising monitoring the operating speed of the load, and the predetermined event detecting that the operating speed is at or above a predetermined level.

14. The method of claim 13, wherein the predetermined level is approximately 95% of the maximum speed of the load.

15. The method of claim 14, further comprising monitoring the plurality of power cells to detect when a power cell has been bypassed, and wherein the predetermined event comprises detection of a bypass.

16. The method of claim 14, wherein the use of overmodulation is also performed under transient conditions.

17. The method of claim 14, wherein the use of overmodulation comprises sinusoidal modulation.

18. The method of claim 14, wherein the use of overmodulation comprises sinusoidal modulation with third-harmonic injection.

* * * * *